(12) United States Patent
Chen et al.

(10) Patent No.: US 12,170,953 B2
(45) Date of Patent: Dec. 17, 2024

(54) NETWORK SLICING APPLICATION ACCESS CONTROL

(71) Applicant: ORANGE, Issy-les-Moulineaux (FR)

(72) Inventors: Xiaobao Chen, Chatillon (FR); Philippe Lucas, Chatillon (FR); Nick Sampson, Chatillon (FR); Vladimir Renard, Chatillon (FR); Pierre-Alexandre Masson, Chatillon (FR)

(73) Assignee: ORANGE, Issyoles-Moulineaux (FR)

( * ) Notice: Subject to any disclaimer, the term of this patent is extended or adjusted under 35 U.S.C. 154(b) by 301 days.

(21) Appl. No.: 17/642,080

(22) PCT Filed: Sep. 2, 2020

(86) PCT No.: PCT/EP2020/074380
§ 371 (c)(1),
(2) Date: Mar. 10, 2022

(87) PCT Pub. No.: WO2021/047964
PCT Pub. Date: Mar. 18, 2021

(65) Prior Publication Data
US 2022/0386226 A1  Dec. 1, 2022

(30) Foreign Application Priority Data

Sep. 10, 2019  (EP) .................................... 19306091

(51) Int. Cl.
*H04W 48/18* (2009.01)
*H04W 60/00* (2009.01)
*H04W 76/10* (2018.01)

(52) U.S. Cl.
CPC .......... *H04W 48/18* (2013.01); *H04W 60/00* (2013.01); *H04W 76/10* (2018.02)

(58) Field of Classification Search
None
See application file for complete search history.

(56) References Cited

U.S. PATENT DOCUMENTS

2019/0053104 A1\*  2/2019  Qiao ..................... H04W 28/24
2019/0124561 A1   4/2019  Faccin et al.
(Continued)

OTHER PUBLICATIONS

Communication pursuant to Article 94(3) EPC dated Mar. 27, 2023, for corresponding European Application No. 20 761 860.4, 7 pages.
(Continued)

*Primary Examiner* — Anh Vu H Ly
(74) *Attorney, Agent, or Firm* — David D. Brush; Westman, Champlin & Koehler, P.A (57) ABSTRACT

A method for controlling application access to network slicing service at a User Equipment (UE). The method includes: issuing an activation request for establishing network connectivity service for an application executing at the UE, the activation request including an application identifier of the application; determining a network slice for the application based on the activation request; performing a verification of the determined network slice, in accordance with network slicing operator policies; and upon successful verification of the determined network slice, creating a binding between the application identifier and the determined network slice.

15 Claims, 5 Drawing Sheets

(56) References Cited

U.S. PATENT DOCUMENTS

| | | | | |
|---|---|---|---|---|
| 2020/0112492 | A1* | 4/2020 | Chatras | H04W 48/18 |
| 2020/0112907 | A1* | 4/2020 | Dao | H04M 15/66 |
| 2020/0169921 | A1* | 5/2020 | Zhu | H04W 8/02 |
| 2020/0187106 | A1* | 6/2020 | Salkintzis | H04W 4/60 |
| 2020/0196315 | A1* | 6/2020 | Young | H04W 72/53 |
| 2020/0229079 | A1* | 7/2020 | Lee | H04W 48/18 |
| 2020/0236528 | A1* | 7/2020 | Lee | H04W 8/00 |
| 2021/0029046 | A1* | 1/2021 | Mas Rosique | H04L 12/1407 |

OTHER PUBLICATIONS

Qualcomm Incorporated et al., "Correction to URSP and UE preferences for NSSP and SSCMSP", 3GPP Draft; 23503_CR0037R1_5GS_PH1_(REL-15)_S2-184185 WAS 3141_23 503-URSP-UE-PREF-Correction_V3, 3rd Generation Partnership Project (3GPP), Mobile Competence Centre; 650, Route Des Lucioles; F-0692, No. Sanya, P.R. China; Apr. 16, 2018-Apr. 20, 2018 Jun. 10, 2018 (Jun. 10, 2018), XP051458381.

"3rd Generation Partnership Project; Technical Specification Group Services and System Aspects; System Architecture for the 5G System; Stage 2 (Release 15)", 3GPP Draft; 23501-F70_CRS_Impemented, 3rd Generation Partership Project (3GPP), Mobile Competence Centre; 650 Route Des Lucioles; F-06921 Sophia-Antipolis Cedex; France, Sep. 4, 2019 (Sep. 4, 2019), XP051839498.

3rd Generation Partnership Project; Technical Specification Group Services and System Aspects; Procedures for the 5G System; Stage 2 (Release 15), 3GPP TS 23.502 V15.0.0, 258 pages, Dec. 2017.

3rd Generation Partnership Project; Technical Specification Group Services and System Aspects; Telecommunication management; Management of 5G networks and network slicing; Concepts, use cases and requirements (Release 15), 3GPP TS 28.530 V0.4.0, 27 pages, Dec. 2017.

International Search Report dated Nov. 13, 2020 for corresponding International Application No. PCT/EP2020/074380, Sep. 2, 2020.

Written Opinion of the International Searching Authority dated Nov. 13, 2020 for corresponding International Application No. PCT/EP2020/074380, filed Sep. 2, 2020.

"3rd Generation Partnership Project; Technical Specification Group Services and System Aspects; Policy and Charging Control Framework for the 5G System; Stage 2 (Release 16)", 3GPP Standard; Technical Specification; 3GPP TS 23.503, 3rd Generation Partnership Project (3GPP), Mobile Competence Centre ; 650, Route Des Lucioles ; F-06921 Sophia-Antipolis Cedex ; France,vol. SA WG2, No. V16.1.0, Jun. 11, 2019 (Jun. 11, 2019), p. 1-99, XP051753961.

Motorola Mobility et al, "Application Function influence on slice selection", vol. SA WG2, No. Sophia Antipolis, France; Aug. 21, 2017-Aug. 25, 2017, Aug. 21, 2017 (Aug. 21, 2017), 3GPP Draft; S2-175862_4262_502_AFINFLUENCE_V2, 3rd Generation Partnership Project (3GPP), Mobile Competence Centre ; 650, Route Des Lucioles ; F-06921 Sophia-Antipolis Cedex ; FRANCE, Retrieved from the Internet: URL:http://www.3gpp.org/ftp/Meetings_3GPP_SYNC/SA2/Docs/, XP051325708.

Huawei et al, "Solutions for common IMS network through multiple 5GC network slices", vol. SA WG2, No. Sanya, China;, Apr. 30, 2018 (Aug. 30, 2018), 3GPP Draft; S2-184637_E-Mail_REV2_S2-184182_Solutions for Common, 3rd Generation Partnership Project (3GPP), Mobile Competence Centre ; 650, Route Des Lucioles ; F-06921 Sophia-Antipolis Cedex ; Fran, Retrieved from the Internet: URL:http://www.3gpp.org/ftp/tsg%5Fsa/WG2%5FArch/TSGS2%5F127%5FSanya/Docs/, XP051449785.

"3rd Generation Partnership Project; Technical Specification Group Services and System Aspects; System Architecture for the 5G System; Stage 2 (Release 16)", 3GPP Standard; Technical Specification; 3GPP TS 23.501, 3rd Generation Partnership Project (3GPP), Mobile Competence Centre ; 650, Route Des Lucioles ; F-06921 Sophia-Antipolis Cedex ; France, vol. SA WG2, No. V16.1.0, Jun. 11, 2019 (Jun. 11, 2019), p. 1-368, XP051753956.

European Search Report dated Jan. 14, 2020 for corresponding European Application No. 19306091.0, filed Sep. 10, 2019.

* cited by examiner

NETWORK SLICING APPLICATION ACCESS CONTROL

CROSS-REFERENCE TO RELATED APPLICATIONS

This Application is a Section 371 National Stage Application of International Application No. PCT/EP2020/074380, filed Sep. 2, 2020, which is incorporated by reference in its entirety and published as WO 2021/047964 A1 on Mar. 18, 2021, in English.

FIELD OF THE INVENTION

The present invention relates to the field of communications and more particularly to network slicing in a 5G communication network.

TECHNICAL BACKGROUND

A design aspect of the 5G system (5GS) architecture includes the modularization of network functions (NFs) to enable flexible and efficient "network slicing." Network slicing is a 5G concept geared towards making the 5GS an end-to-end (E2E), scalable, and adaptable system that supports various types of communication services, different traffic demands, and different end user types. For example, some of the communication services envisioned to be supported in 5G include enhanced mobile broadband (eMBB), massive Internet of Things (mIoT), and ultra-reliable low latency communication (URLLC).

Figure 1:
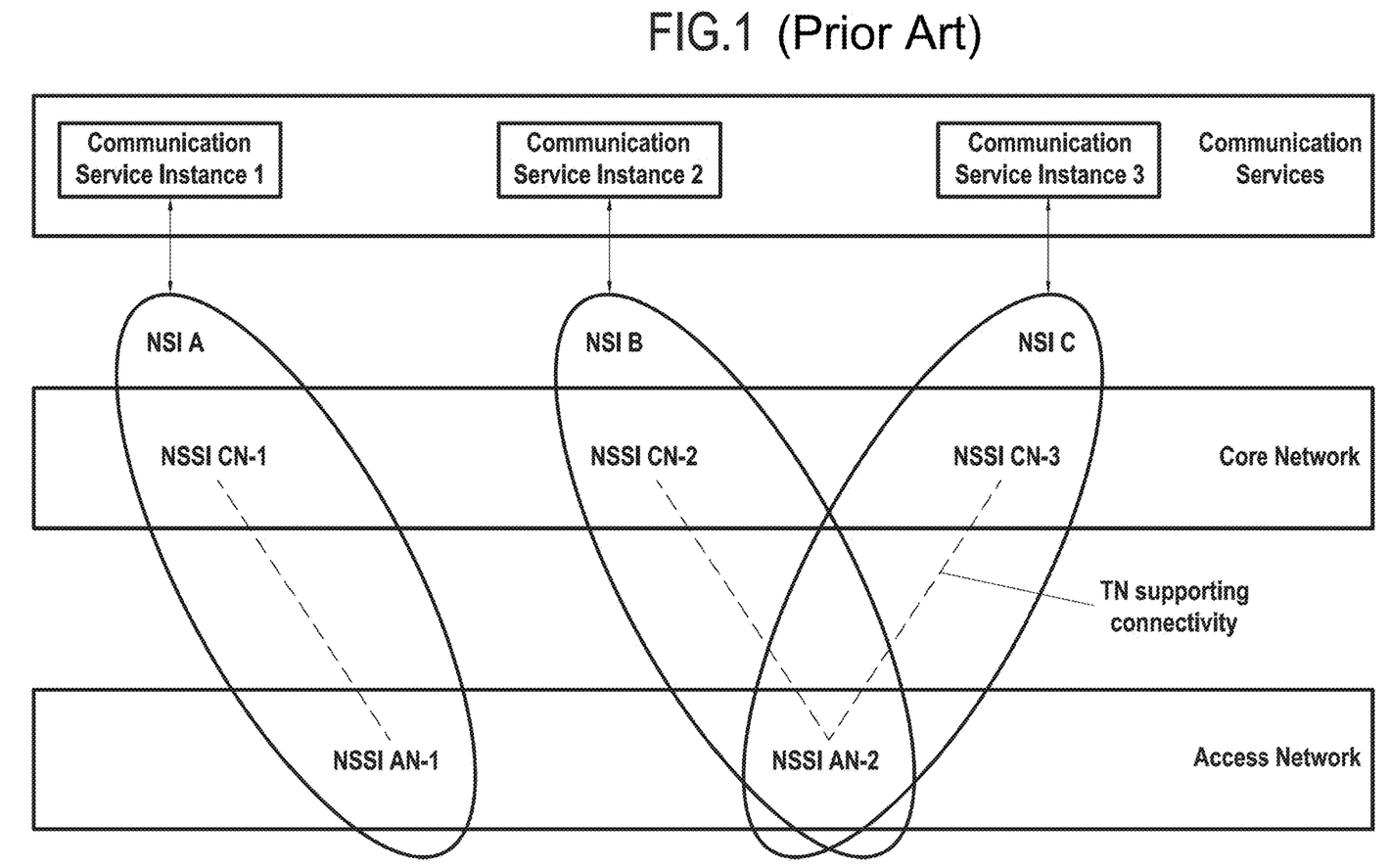
FIG. 1 illustrates the 5G concept of network slicing.

FIG. 1 illustrates the 5G concept of network slicing as described in the 3GPP TS 28.530 v0.4.0 document. As shown in FIG. 1, network slicing is based on sharing all or parts of a common physical infrastructure to create and run multiple logically independent networks each designed to support a respective communication service instance. Specifically, the necessary Core Network (CN) and Access Network (AN) functions are grouped together to pre-configure network slices with varying features. The network slices are deployed to end users as network slice instances (NSIs). For example, FIG. 1 shows three different network slice instances, NSI A, NSI B, and NSI C deployed to serve respectively a first communication service instance (Communication Service Instance 1), a second communication service instance (Communication Service Instance 2), and a third communication service instance (Communication Service Instance 3). NSI A is a network slice instance of a network slice that provides a CN function (CN-1) and an AN function (AN-1). As such, NSI A includes a Network Slice Subnet Instance (NSSI) of CN-1 (i.e., a CN-1 instance) and a NSSI of AN-1 (i.e., an AN-1 instance). Similarly, NSI B is a network slice instance of a network slice that provides a CN-2 function and an AN-2 function. NSI C is a network slice instance of a network slice that provides a CN-3 function and the same AN-2 function provided by NSI B.

A network slice instance is identified by an S-NSSAI (Single-Network Slice Selection Assistance Information), which includes a Slice/Service Type (SST) and Slice Differentiator (SD). The SST specifies the expected network slice behavior in terms of features and services. The SD, which is optional, complements the so SST to differentiate amongst multiple network slice instances having the same SST. For example, an operator can deploy multiple network slice instances delivering the same features but for different groups of UEs. Such network slice instances would have the same SST but different SDs, thus different S-NSSAIs.

A UE may be served by a 5G network using one or more network slice instances simultaneously and may be associated with a total of eight different S-NSSAIs at a given time. A collection of S-NSSAIs is referred to as an NSSAI. An NSSAI may be an Allowed NSSAI, a Configured NSSAI, or a Requested NSSAI. An Allowed NSSAI is an NSSAI provided by the serving Public Land Mobile Network (PLMN) to the UE during a registration procedure, for example, and indicates the S-NSSAIs to be used by the UE in the serving PLMN. A Configured NSSAI represents an NSSAI provisioned in the UE per PLMN. A Requested NSSAI is an NSSAI provided by the UE to the serving PLMN during registration and contains the S-NSSAI(s) of the network slice instance(s) to which the UE wishes to register.

Figure 2:
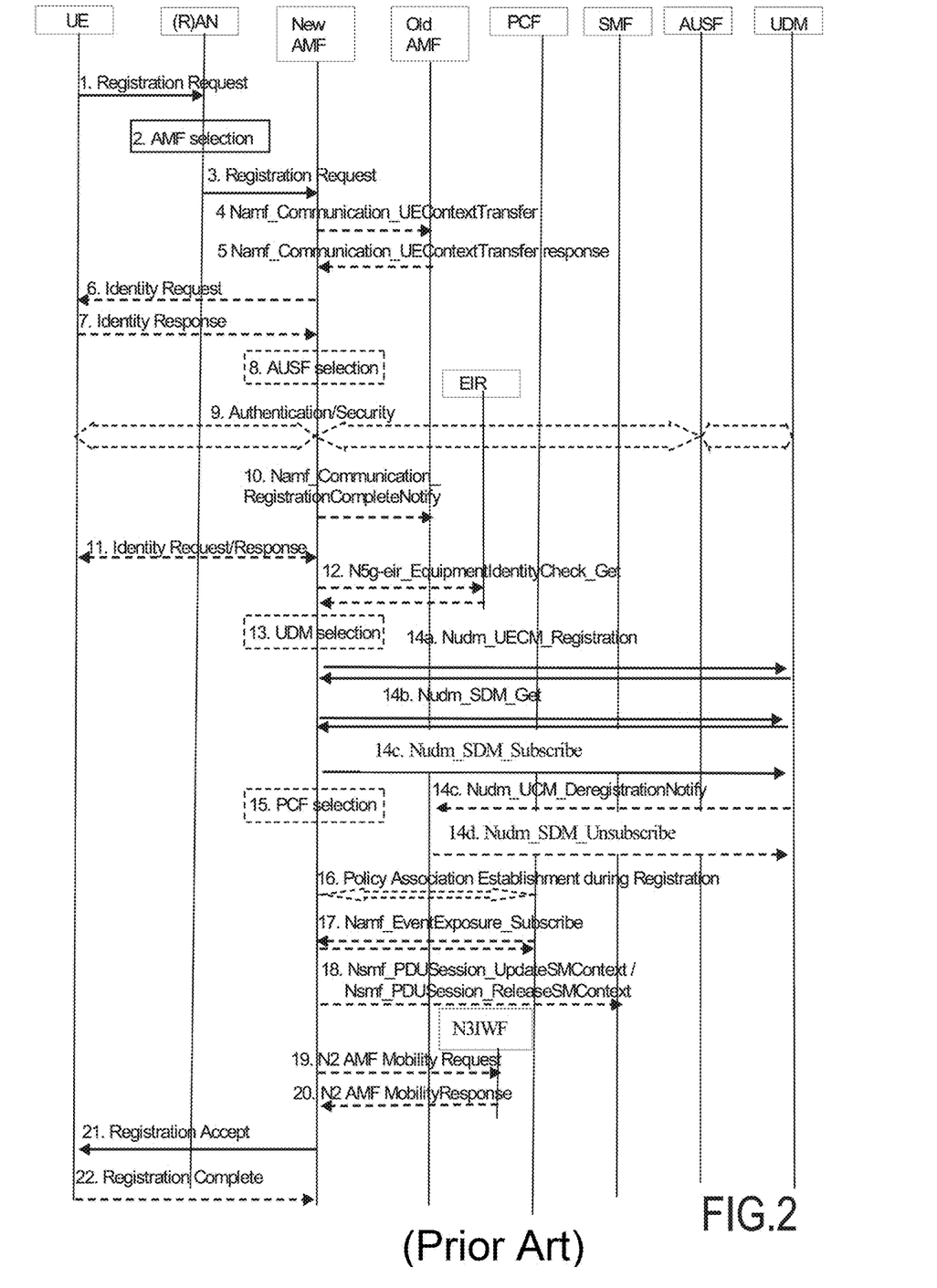
FIG. 2 illustrates a procedure for a User Equipment (UE) to register with a 5G system.

FIG. 2 illustrates the registration procedure for a UE to register with a 5GS. A detailed description of this procedure can be found in 3GPP TS 23.502 v15.0.0 (section 4.2.2.2.) and will not be repeated herein. It is envisioned that this procedure will be used by a UE to register with network slice instances. Specifically, when the UE registers with a PLMN, if the UE has for the PLMN a Configured NSSAI or an Allowed NSSAI, then the UE provides a Requested NSSAI to the network. The Requested NSSAI corresponds to the Configured NSSAI or a subset thereof when the UE has no Allowed NSSAI for the PLMN. Otherwise, if the UE has an Allowed NSSAI for the PLMN, the Requested NSSAI is the Allowed NSSAI or a subset thereof and, if the UE additionally has a Configured NSSAI for the PLMN, the Requested NSSAI further includes one or more S-NSSAI(s) from the Configured NSSAI that are not already present in the Allowed NSSAI and that have not been previously rejected by the network.

The Requested NSSAI provided by the UE allows the network to select a serving Access Management Function (AMF) for the UE. The serving AMF verifies the Requested NSSAI against UE Subscription Information (containing one or more Subscribed S-NSSAIs) and interacts with the Network Slice Selection Function (NSSF) to select the set of network slice instance(s) to serve the UE.

The 3GPP TS 23.503 v16.1.0 document describes a User Route Selection Policy (URSP) that a UE can use to determine whether a detected application can be associated to an established Protocol Data Unit (PDU) session; can be off-loaded to non-3GPP access (e.g., WiFi); or can trigger the establishment of a new PDU session. However, the existing 5G standards do not describe how a network slice can be determined for a particular application and how network slice access can be controlled—according to the operator's policies at the UE and over 3GPP and non-3GPP access networks.

The present invention has been made in the light of these gaps in the existing 5G standards.

SUMMARY OF THE INVENTION

The present invention provides a method for controlling application access to network slicing service at a User Equipment (UE). In an embodiment, the method comprises:

issuing an activation request for establishing network connectivity service for an application executing at the UE, the activation request including an application identifier of the application;

determining a network slice for the application based on the activation request;

performing a verification of the determined network slice, in accordance with network slicing operator policies; and upon successful verification of the determined network slice, creating a binding between the application identifier and the determined network slice.

The binding between the application identifier and the determined network slice allows the UE to enforce the use of the determined network slice by flows belonging to the application.

In an embodiment, the method comprises: receiving a packet associated with the application; and associating the packet, according to the binding, with a Protocol Data Unit (PDU) session matching the determined network slice for the application. In an embodiment, the packet is received via a socket that is uniquely associated with the application via its application identifier.

In an embodiment, to obtain access to the network slicing service, an application registers with a server of the network operator or a third party to which the network operator provides network services such as network slicing service. Specifically, the method may comprise: sending a registration request for the application to an Application Layer Function (ALF) server; and receiving the application identifier from the ALF server upon successful registration of the application.

The application identifier uniquely identifies the application at the ALF server.

In an embodiment, the method comprises receiving security information and charging information for the application from the ALF server upon successful registration of the application.

In an embodiment, the registration request includes information associated with an ALF instance created at the UE. The information associated with the ALF instance may include ALF instance identifying information for identifying the ALF instance to the ALF server and ALF instance authentication information for authenticating the ALF instance to the ALF server.

In an embodiment, the activation request includes service level information associated with the application. The service level information may include network slicing information associated with the application. The network slicing information may include GSMA Generic Slice Template (GST) and/or Network Slice Type (NEST) information.

In an embodiment, the method comprises mapping the network slicing information to determine the network slice for the application.

In an embodiment, the method comprises:
issuing a modification request for modifying the established network connectivity service for the application, the modification request including the application identifier of the application;
determining a new network slice for the application based on the modification request;
performing a verification of the determined new network slice, in accordance with the network slicing operator policies; and
creating a new binding between the application identifier and the new network slice.

In another embodiment, the method comprises:
sending a registration modification request for the application to the ALF server; and receiving a new application identifier from the ALF server upon successful modification of the registration of the application. In an embodiment, the method also comprises receiving security information and/or charging information associated with the modified registration.

In another aspect, the present invention provides a UE, comprising:
a processor; and
memory storing instructions that, when executed by the processor, configure the processor to perform a method according to any of the method embodiments described above.

In an embodiment, any of the above-described method embodiments may be implemented as instructions of a computer program. As such, the present disclosure provides a computer program including instructions that when executed by a processor cause the processor to execute a method according to any of the above-described method embodiments.

The computer program can use any programming language and may take the form of a source code, an object code, or a code intermediate between a source code and an object code, such as a partially compiled code, or any other desirable form.

The computer program may be recorded on a computer-readable medium. As such, the present disclosure is also directed to a computer-readable medium having recorded thereon a computer program as described above. The computer-readable medium can be any entity or device capable of storing the computer program.

BRIEF DESCRIPTION OF THE DRAWINGS

Further features and advantages of the present invention will become apparent from the following description of certain embodiments thereof, given by way of illustration only, not limitation, with reference to the accompanying drawings in which.

DETAILED DESCRIPTION OF EXAMPLE EMBODIMENTS

Systems and methods for controlling application access to network slicing service in a 5G network are disclosed herein.

Figure 3:
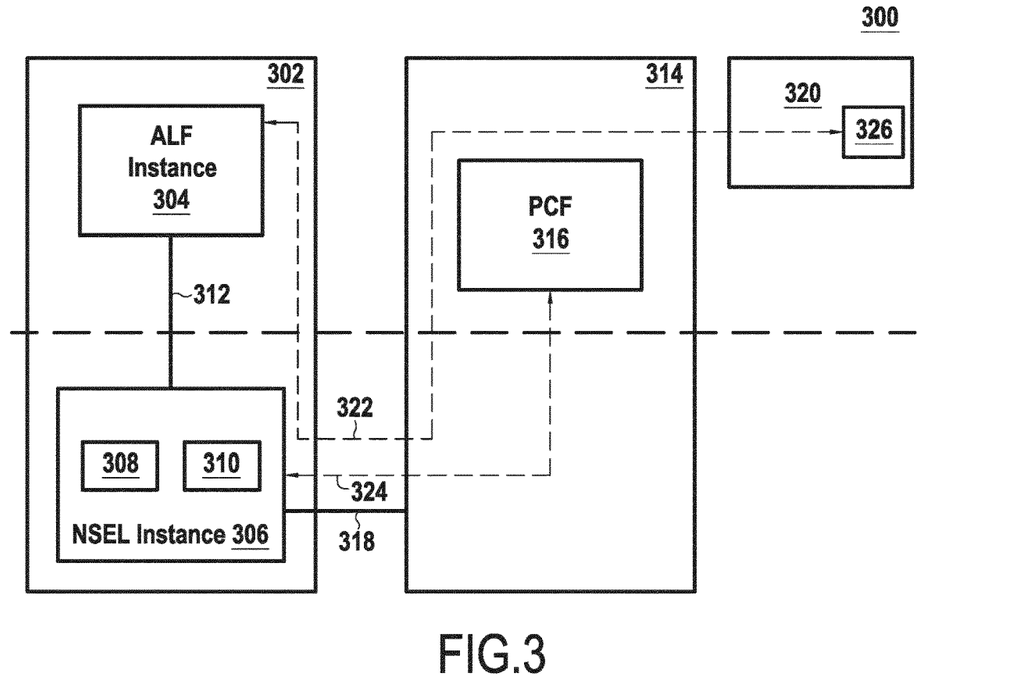
FIG. 3 is a block diagram that illustrates an example system according to an embodiment of the present invention.

FIG. 3 is a block diagram that illustrates an example system 300 in which embodiments may be implemented. Example system 300 is provided for the purpose of illustration only and is not limiting of embodiments.

As shown in FIG. 3, example system 300 includes a User Equipment (UE) 302, a 3GPP network system 314, and a server 320.

In a non-limiting embodiment, UE 302 implements an Application Layer Function (ALF) which can be instantiated to generate at least one ALF instance 304 running at UE 302. UE 302 also implements a Network Service Enabling Layer (NSEL) which can be instantiated to generate at least one NSEL instance 306 running at UE 302. Communication between ALF instances, such as ALF instance 304, and NSEL instances, such as NSEL instance 306, is supported by an Application Support Interface (ASI) 312.

In an example embodiment, NSEL instance 306 includes an ALF Management and Configuration Function 308 and a Network Policy Enforcement Function 310.

3GPP network system 314 includes a 5G Policy Control Function (PCF) 316. In an embodiment, PCF 316 supports a User Route Selection Policy (URSP) function as described in the 3GPP TS 23.503 v16.1.0 document, the URSP function being further extended, according to embodiments, to support network slicing access control functions as further described below.

In an embodiment, NSEL instance 306 communicates with 3GPP network system 314 via a Network Connectivity Interface (NCI) 318. In a particular embodiment, NCI 318 enables a communication path 324 between NSEL instance 306 and PCF 316.

Network operator server 320 belongs to an operator of the communication network or a third party for which the network operator provides network services such as network connectivity with network slicing. In an embodiment, server 320 implements an Application Layer Function (ALF) server 326, configured to interact with ALF instances, such as ALF instance 304. In an embodiment, an Application Layer Interface (ALI) 322 is enabled by ASI 312, NSEL instance 306, NCI 318, and 3GPP network system 314 between ALF instances and network ALF 326.

In an embodiment, ALF instance 304 may support one or more applications residing at UE 302 (not shown in FIG. 3). The supported applications may be of any type, including, for example, video, voice, gaming, mobility, Internet of Things (IoT), etc.

For a given supported application, ALF instance 304 may store information identifying the application and service level information associated with the application. The service level information may include Quality of Service (QoS) information, Quality of Experience (QoE) information, and/or network slicing information such as GSMA Generic Slice Template (GST) and/or Network Slice Type (NEST) information associated with the application. GST and/or NEST information describes requirements of the application using a generic set of attributes. GST and/or NEST information may be as defined by the GSMA NG.116 Generic Network Slice Template v0.1.

In an embodiment, ALF instance 304 interacts with ALF server 326 of server 320 to obtain an application identifier, security credentials, and/or charging policy information for a supported application.

In a particular embodiment, ALF instance 304 registers the application with ALF server 326 to obtain an application identifier for the application at ALF server 326. The application identifier uniquely identifies the application at ALF server 326 and at the NSEL level.

Figure 4:
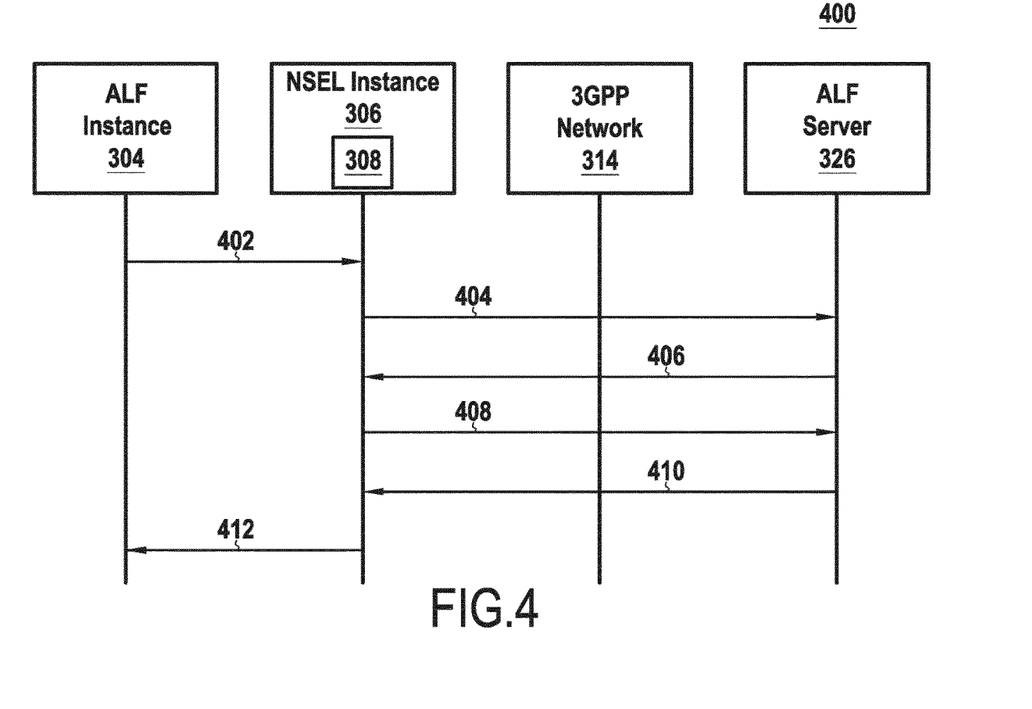
FIG. 4 illustrates an example process for registering an application for access to network slicing service according to an embodiment.

FIG. 4 illustrates an example process 400 for registering an application for access to network slicing service according to an embodiment. For the purpose of illustration only, example process 400 is shown as being performed by example system 300 of FIG. 3. However, as would be understood by a person of skill in the art based on the teachings herein, example process 400 may be performed in a different system than illustrated in FIG. 3.

As shown in FIG. 4, example process 400 begins in step 402, which includes ALF instance 304 sending a registration request for the application to ALF server 326. In an embodiment, ALF instance 304 issues a registration request (AL-F_Register_Request) via an Application Programming Interface (API) provided by network to send the registration request.

In an embodiment, the registration request includes information identifying the application, service level information associated with the application, and/or UE subscriber information. The service level information may include QoS information, QoE information, and/or network slicing information such as GSMA GST and/or NEST information associated with the application.

The registration request may also include information associated with ALF instance 304. The information associated with ALF instance 304 may include ALF instance identifying information for identifying ALF instance 304 to ALF server 326. The information associated with ALF instance 304 may also include ALF instance authentication information for authenticating ALF instance 304 to ALF server 326.

The registration request may be sent via NSEL Instance 306 as shown in FIG. 4 or may bypass NSEL instance 306.

In an embodiment, as shown in FIG. 4, the registration request arrives at NSEL instance 306 and is processed by ALF Management and Configuration Function 308 of NSEL instance 306. Subsequently, ALF Management and Configuration Function 308 interacts with ALF server 326 to perform an authentication and an authorization based on the registration request.

Specifically, in step 404, ALF Management and Configuration Function 308 sends an authentication request to ALF server 326. In an embodiment, the authentication request includes the ALF instance identifying information and the ALF instance authentication information. The ALF instance identifying information and/or the ALF instance authentication information may be extracted by ALF Management and Configuration Function 308 from the registration request issued by ALF instance 304. Alternatively, ALF Management and Configuration Function 308 may generate the ALF instance identifying information and/or the ALF instance authentication information itself in response to the registration request.

In step 406, ALF server 326 responds to the authentication request from ALF Management and Configuration Function 308 with an authentication response. If authentication failed, process 400 terminates. Otherwise, process 400 continues to step 408, which includes ALF Management and Configuration Function 308 sending an authorization request to ALF server 326.

As would be understood by a person of skill in the art based on the teachings herein, in other embodiments, the authentication and authorization requests may be sent successively (i.e., without an intervening response from ALF server 326) or as a single request from ALF Management and Configuration Function 308 to ALF server 326.

In an embodiment, the authorization request includes the information identifying the application, the service level information associated with the application, and/or the UE subscriber information.

Based on one or more of the information contained in the authorization request, ALF server 326 accepts or not the registration request of the application. In an embodiment, ALF server 326 successfully registers the application upon determining that the UE is permitted access to network slicing service based on the UE subscriber information contained in the authorization request.

ALF server 326 sends, in step 410, a registration response to ALF Management and Configuration Function 308.

If registration of the application is successful, the registration response includes an application identifier of the application. The application identifier uniquely identifies the application at ALF server 326 and at the NSEL level.

In an embodiment, the registration response also includes security information for authenticating and securing the interactions between the application and ALF server 326. In an embodiment, ALF server 326 generates the necessary security information for the application upon successful registration of the application. The security information may include, for example, a password or a verification code as well as security keys and/or other security credentials that allow the application to authenticate itself and secure its interactions with ALF server 326 subsequently.

In an embodiment, the registration response also includes charging information. The charging information may include credits or tokens to be paid by the application for use of the service.

ALF Management and Configuration Function 308 verifies the information carried by the registration response and configures ALF instance 304 accordingly in step 412. In an embodiment, ALF Management and Configuration Function 308 exposes the application identifier and the security information to ALF instance 304 via an API.

The registration process terminates with ALF instance 304 receiving the application identifier of the application in step 412. ALF instance 304 may subsequently request network connectivity service access for the application using the application identifier as further described below with reference to FIG. 5.

According to embodiments, ALF instance 304 may request to modify the registration of an application. In an embodiment, ALF instance 304 uses a registration modification request API (ALF_Register_Modify) provided by network or ALF server 326 to send a registration modification request to ALF server 326. The registration modification request may result in modification of the application identifier and/or the security information associated with the application.

An ALF instance 304 may also request to delete the registration of an application. In an embodiment, an ALF instance 304 uses a registration deletion request API (ALF_Register_Delete) provided by network or ALF server 326 to send the registration deletion request to ALF server 326. In an embodiment, ALF instance 304 sends a registration deletion request to ALF server 326 when the application is terminated or wishes to disconnect from the network.

Figure 5:
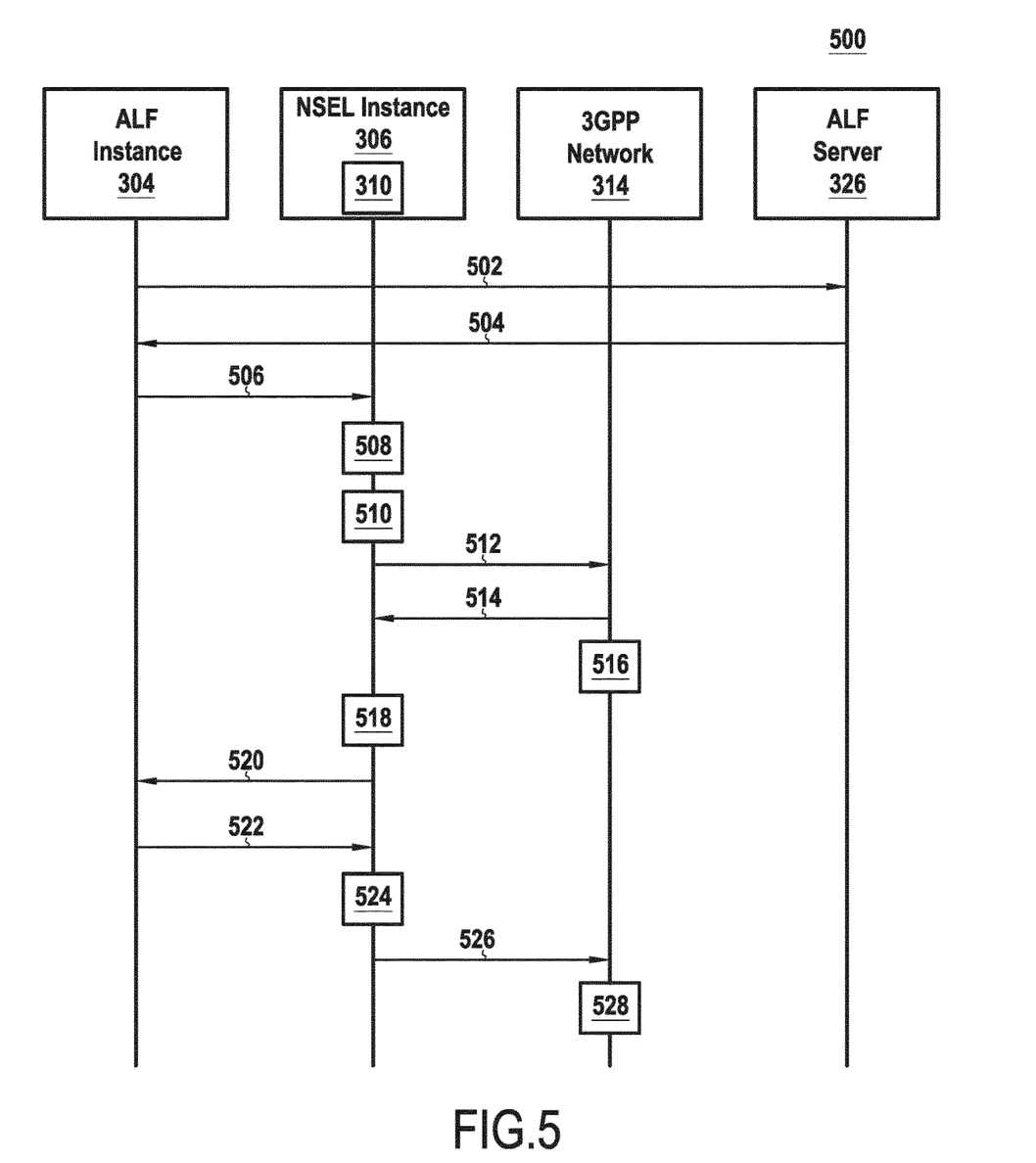
FIG. 5 illustrates an example process involving application access to network slicing service according to an embodiment of the present invention.

FIG. 5 illustrates an example process 500 involving application access to network slicing service according to an embodiment of the present invention. For the purpose of illustration only, example process 500 is shown as being performed by example system 300 of FIG. 3. However, as would be understood by a person of skill in the art based on the teachings herein, example process 500 may be performed in a different system than illustrated in FIG. 3.

As shown in FIG. 5, example process 500 begins in step 502, which includes ALF instance 304 sending a login request to ALF server 326. In an embodiment, the login request may include ALF instance identifying information for identifying ALF instance 304 to ALF server 326 and/or ALF instance authentication information for authenticating ALF instance 304 to ALF server 326.

In step 504, ALF server 326 responds to the login request from an ALF instance 304, granting or denying the login depending on whether ALF instance 302 is successfully authenticated using the ALF instance authentication information. In an embodiment, a successful login results in ALI 322 being setup between ALF instance 304 and ALF server 326.

As would be understood by a person of skill in the art based on the teachings herein, in other embodiments, process 500 may begin in step 506, with an ALF instance 304 having previously logged in to ALF server 326.

In step 506, ALF instance 304 issues an activation request for establishing network connectivity service for an application executing at the UE. It is assumed herein that the application has been previously registered by the ALF instance 304 with an ALF server 326. As such, the activation request includes an application identifier of the application, obtained using the registration process described above with reference to FIG. 4.

The activation request may also include service level information associated with the application. The service level information may include QoS information, QoE information, and/or network slicing information such as GSMA GST and/or NEST information associated with the application. GST and/or NEST information describes requirements of the application using a generic set of attributes. GST and/or NEST information may be as defined by the GSMA NG.116 Generic Network Slice Template v0.1.

In an embodiment, ALF instance 304 uses a service activation API (NSEL_Service_Activate) provided by NSEL instance 306 to send the activation request to NSEL instance 306.

In step 508, NSEL instance 306 processes the network slicing information associated with the application (which may include GST information mapped to either standardized or non-standardized NEST information) and maps it to an appropriate network slice, S-NSSAI (Allowed, Requested or Configured NSSAI as defined in TS23.501/TS23.502).

Subsequently, in step 510, NSEL instance 306, via Network Policy Enforcement Function 310, initiates a verification of the S-NSSAI determined for the application.

Specifically, in step 512, Network Policy Enforcement Function 310 sends a UE registration request or a PDU establishment request (depending on whether the UE is registered or not with the network) to 3GPP network system 314. The UE registration request or PDU establishment request includes the S-NSSAI determined for the application and a flow descriptor that uniquely identifies the flow associated with the application. In an embodiment, Network Policy Enforcement Function 310 implements the UE procedure for associating applications to allocated network slice(s) and associated PDU sessions based on URSP as described in section 6.6.2.3 of 3GPP TS 23.503 V16.1.0 to determine a valid Route Selection Descriptor (which includes a network slice selection) for the application and the PDU session(s) that matches all components in the selected Route Selection Descriptor.

At 3GPP network system 314, a Session Management Function (SMF) checks the S-NSSAI determined for the application against network slicing operator policies, including PCF/URSP policies. If the S-NSSAI complies with the network slicing operator policies, 3GPP network system 314 successfully verifies the S-NSSAI. Otherwise, 3GPP network system 314 denies the S-NSSAI for the application and may replace it by another allowed S-NSSAI. 3GPP network system 314 sends the verification result to NSEL instance 306 in step 514.

Subsequently, in step 516, the 3GPP network system 314 (e.g. SMF) creates and maintains a mapping between the flow descriptor of the application and the S-NSSAI allocated by the network for the application.

Next, in step 518, Network Policy Enforcement Function 310 creates and maintains a binding between the application identifier (and/or flow descriptor) of the application and the S-NSSAI allocated by the network to the application.

Then, in step 520, Network Policy Enforcement Function 310 sends a response to the activation request to ALF instance 304 informing it of the successful establishment of network connectivity service for the application. In an embodiment, NSEL instance 306 uses the service activation API (NSEL_Service_Activate) to inform ALF instance 304.

Subsequently, application data may flow from the application, via ALF instance 304, to NSEL instance 306 for transmission over 3GPP network system 314. In an embodiment, ALF instance 304 receives a packet from the application and forwards the packet to NSEL instance 306 in step 522. For example, ALF instance 304 may use a socket over the NSEL API uniquely programmed to send and receive packets over the NSEL instance via the allocated network slice through the network. ALF instance 304 specifies the application identifier of the application in forwarding the packet to NSEL instance 306.

In step 524, Network Policy Enforcement Function 310 uses the maintained binding between the application identifier (and/or the flow descriptor) of the application and the allocated S-NSSAI for the application to associate the packet with a PDU session matching the network slice allocated for the application. In an embodiment, Network Policy Enforcement Function 310 enforces the URSP determinations made by NSEL instance 306 for the application by ensuring that packets of the application (with the authorized application identifier) are only allowed to be sent and/or received through a socket uniquely serving the application with the application ID to access the determined network slice and over the matching PDU session(s).

The packet may then be transmitted in step 526 over the allocated network slice and the matching PDU session to 3GPP network system 314.

In an embodiment, within 3GPP network system 314, the SMF monitors the network slice access by the application in step 528. Particularly, relying on the stored mapping created in step 516, the SMF may enforce usage by packets with the flow descriptor of the application of the determined network slice for the application. SMF may also monitor usage of network resources including the allocated network slice(s) by the application and enforce usage rules in accordance with the determined network slice selection for the application.

If the desired service level requirements/or the desired network slicing services of the application change, an ALF instance 304 may request modification of the established network connectivity service for the application. In an embodiment, ALF instance 302 uses a service modification API (NSEL_Service_Modify) provided by NSEL instance 306 to send a modification request to NSEL instance 306. The modification request may include similar information as described above for an activation request.

ALF instance 304 may cancel an established network connectivity service for the application when the application is shut down. In an embodiment, ALF instance 302 uses a service cancellation API (NSEL_Service_Cancel) provided by NSEL instance 306 to send a cancellation request to NSEL instance 306.

Figure 6:
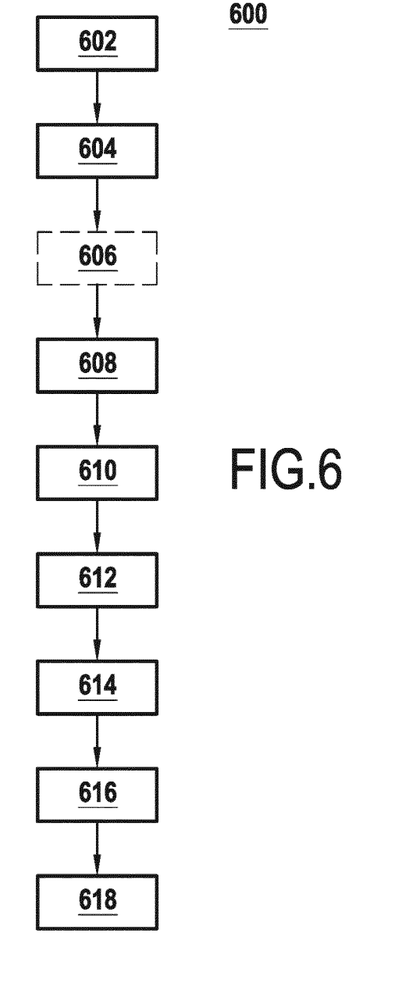
FIG. 6 illustrates an example process for controlling application access to network slicing service according to an embodiment of the present invention.

FIG. 6 illustrates an example process 600 for controlling application access to network slicing service according to an embodiment of the present invention. Example process 600 is provided for the purpose of illustration only and is not limiting of embodiments. In an embodiment, example process 600 is performed at a UE.

As shown in FIG. 6, process 600 begins in step 602, which includes sending a registration request for an application executing at the UE to an ALF server.

In an embodiment, the registration request includes information identifying the application, service level information associated with the application, and/or UE subscriber information. The service level information may include QoS information, QoE information, and/or network slicing information such as GSMA GST and/or NEST information associated with the application.

In an embodiment, the registration request is issued by an ALF instance executing at the UE. The registration request may include information associated with the ALF instance executing at the UE. The information associated with the ALF instance may include ALF instance identifying information for identifying the ALF instance to the ALF server and ALF instance authentication information for authenticating the ALF instance to the ALF server.

Step 604 includes receiving an application identifier from the ALF server upon successful registration of the application. The application identifier uniquely identifies the application at the ALF server.

In an embodiment, step 604 further includes receiving security information and/or charging information associated with the application. The security information may include, for example, a password or a verification code as well as security keys and/or other security credentials that allow the application to authenticate itself and secure its interactions with the ALF server. The charging information may include credits or tokens to be paid by the application for use of the service.

Next, optional step 606 includes the ALF instance logging in to the ALF server to make a service request. In another embodiment, no login is required by the ALF instance.

Subsequently, step 608 includes issuing an activation request for establishing network connectivity service for the application. In an embodiment, the activation request includes the application identifier of the application as received from the ALF server. The activation request may also include service level information associated with the application. The service level information may include QoS information, QoE information, and/or network slicing information such as GSMA GST and/or NEST information associated with the application. GST and/or NEST information describes requirements of the application using a generic set of attributes. GST and/or NEST information may be as defined by the GSMA NG.116 Generic Network Slice Template v0.1.

Next, step 610 includes determining a network slice for the application is based on the activation request. In an embodiment, step 610 comprises mapping the network slicing information contained in the activation request to a network slice (S-NSSAI).

Subsequently, step 612 includes performing a verification of the determined network slice, in accordance with network slicing operator policies. In an embodiment, step 612 includes sending a UE registration request of a PDU establishment request including the determined S-NSSAI for the application to the 3GPP network, and receiving a response verifying or denying the determined S-NSSAI.

Next, if verification is successful at step 612, step 614 includes creating a binding between the application identifier and the S-NSSAI determined for the application. In an embodiment, the binding is created and maintained by the NSEL instance executing at the UE.

Subsequently, step 616 includes receiving a packet associated with the application. In an embodiment, the packet is received by the NSEL instance from the ALF instance. In an embodiment, the packet is received via a socket that is uniquely associated with the application via its application identifier. The socket may be a part of the API provided by the NSEL instance.

Process 600 ends with step 618, which includes associating the packet, according to the binding, with a PDU session matching the determined network slice for the application. In an embodiment, step 618 is performed by the NSEL instance.

Figure 7:
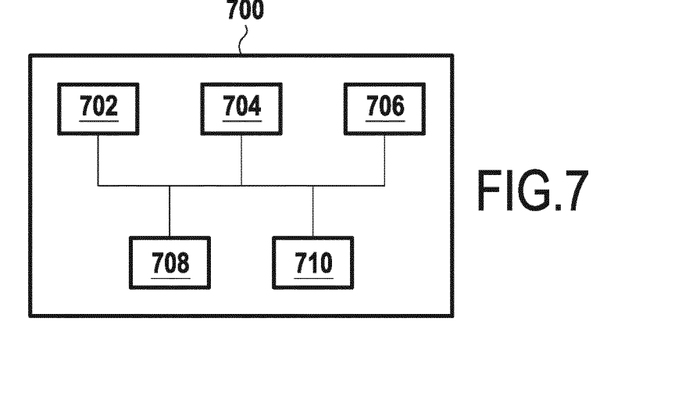
FIG. 7 illustrates a computer device which may be used to implement embodiments of the present invention.

FIG. 7 illustrates a computer device 700 which may be used to implement embodiments of the present invention. Specifically, the above-described ALF instance 304, NSEL instance 306, ALF Management and Configuration Function 308, Network Policy Enforcement Function 310, and ALF server 326 may each be implemented using a computer device such as computer device 700.

As shown in FIG. 7, computer device 700 includes a processor 702, a read-only memory (ROM) 704, a random access memory (RAM) 706, a non-volatile memory 708, and communication means 710 (i.e., a sender and a receiver) suitable for supporting the communication functions of the implementing module (e.g., ALF instance 304, NSEL instance 306, ALF Management and Configuration Function 308, Network Policy Enforcement Function 310, and ALF server 326).

The ROM 704 of the computer device 700 may store a computer program including instructions that when executed by processor 702 cause processor 702 to perform a method of the present invention. The method may include one or more of the steps described above in FIGS. 4, 5, and 6.

Additional Variants

Although the present invention has been described above with reference to certain specific embodiments, it will be understood that the invention is not limited by the particularities of the specific embodiments. Numerous variations, modifications and developments may be made in the above-described embodiments within the scope of the appended claims.

The invention claimed is:

1. A method for controlling application access to network slicing service at a User Equipment, UE, the method being executed by said UE and comprising:
issuing an activation request for establishing network connectivity service for an application executing at the UE, the activation request comprising an application identifier of the application and service level information comprising network slicing information associated with the application;
determining a network slice for the application based on said application identifier and said service level information;
sending a request comprising the determined network slice for the application to a network system; and
upon reception of a response from the network system verifying that the determined network slice for the application complies with network slicing operator policies, creating a binding between the application identifier and the determined network slice.

2. The method of claim 1, comprising:
receiving a packet associated with the application; and
associating the packet, according to the binding, with a Protocol Data Unit, PDU, session matching the determined network slice for the application.

3. The method of claim 1, comprising:
sending a registration request for the application to an Application Layer Function, ALF, server; and
receiving the application identifier from the ALF server upon successful registration of the application.

4. The method of claim 3, wherein the application identifier uniquely identifies the application at the ALF server.

5. The method of claim 3, further comprising receiving security information and charging information for the application from the ALF server upon successful registration of the application.

6. The method of claim 1, wherein the activation request includes service level information associated with the application.

7. The method of claim 6, wherein the service level information includes network slicing information associated with the application.

8. The method of claim 7, wherein the network slicing information includes GSMA Generic Slice Template, GST, and/or Network Slice Type, NEST, information.

9. The method of claim 7, comprising mapping the network slicing information to determine the network slice for the application.

10. The method of claim 3, wherein the registration request includes information associated with an ALF instance executing at the UE.

11. The method of claim 10, wherein the information associated with the ALF instance includes ALF instance identifying information for identifying the ALF instance to the ALF server and ALF instance authentication information for authenticating the ALF instance to the ALF server.

12. The method of claim 1, comprising:
issuing a modification request for modifying the established network connectivity service for the application, the modification request including the application identifier of the application;
determining a new network slice for the application based on the modification request;
performing a verification, by exchanging messages with the network system, of the determined new network slice, in accordance with the network slicing operator policies; and
creating a new binding between the application identifier and the new network slice.

13. The method of claim 1, comprising:
sending a registration modification request for the application to the ALF server; and
receiving a new application identifier from the ALF server upon successful modification of the registration of the application.

14. A User Equipment, UE, comprising:
a processor; and
memory storing instructions that, when executed by the processor, configure the processor to perform a method for controlling application access to network slicing service, the method comprising:
issuing an activation request for establishing network connectivity service for an application executing at the UE, the activation request comprising an application identifier of the application and service level information comprising network slicing information associated with the application;
determining a network slice for the application based on said application identifier and said service level information;
sending a request comprising the determined network slice for the application to a network system; and upon reception of a response from the network system verifying that the determined network slice for the application complies with network slicing operator policies, creating a binding between the application identifier and the determined network slice.

15. A non-transitory computer-readable medium comprising instructions stored thereon that when executed by a processor of a User Equipment, UE, cause the processor to execute a method for controlling application access to network slicing service, the method comprising:

issuing an activation request for establishing network connectivity service for an application executing at the UE, the activation request comprising an application identifier of the application and service level information comprising network slicing information associated with the application;

determining a network slice for the application based on said application identifier and said service level information;

sending a request comprising the determined network slice for the application to a network system; and upon reception of a response from the network system verifying that the determined network slice for the application complies with network slicing operator policies, creating a binding between the application identifier and the determined network slice.

* * * * *

UNITED STATES PATENT AND TRADEMARK OFFICE
CERTIFICATE OF CORRECTION

| | | |
|---|---|---|
| PATENT NO. | : 12,170,953 B2 | Page 1 of 1 |
| APPLICATION NO. | : 17/642080 | |
| DATED | : December 17, 2024 | |
| INVENTOR(S) | : Xiaobao Chen et al. | |

It is certified that error appears in the above-identified patent and that said Letters Patent is hereby corrected as shown below:

On the Title Page

Item (73) Column 1, please delete "Issyoles-Moulineaux" and insert therefore
--Issy-les-Moulineaux--.

Signed and Sealed this
Twenty-fifth Day of February, 2025

Coke Morgan Stewart
*Acting Director of the United States Patent and Trademark Office*